United States Patent
Nambu

[19]
[11] Patent Number: 6,032,311
[45] Date of Patent: Mar. 7, 2000

[54] EGG WASHING APPARATUS

[75] Inventor: Kunio Nambu, Kyoto, Japan

[73] Assignee: Nambu Electric Co., Ltd., Kyoto, Japan

[21] Appl. No.: 09/119,782

[22] Filed: Jul. 21, 1998

[30] Foreign Application Priority Data

Sep. 29, 1997 [JP] Japan ................. 9-009176 U

[51] Int. Cl.[7] ................................................ A01K 43/00
[52] U.S. Cl. ................ 15/3.15; 15/3.16; 15/3.14; 134/131
[58] Field of Search .................. 15/3.12, 3.13, 15/3.14, 3.15, 3.16; 134/124, 131, 64 R, 122 R; 198/861.5

[56] References Cited

U.S. PATENT DOCUMENTS

| | | |
|---|---|---|
| 2,566,475 | 9/1951 | Wright . |
| 2,588,787 | 3/1952 | Wright ........................ 15/3.13 |
| 2,615,187 | 10/1952 | Gwin et al. ................. 15/3.12 |
| 2,640,209 | 6/1953 | Johnson . |
| 2,673,361 | 3/1954 | McCutchan . |
| 3,267,943 | 8/1966 | Kuhl et al. . |
| 3,909,290 | 9/1975 | Peppler et al. . |
| 5,331,702 | 7/1994 | Willsey et al. . |
| 5,634,397 | 6/1997 | Hutchinson et al. . |
| 5,758,378 | 6/1998 | Kristensen . |
| 5,918,610 | 7/1999 | Tate et al. . |

FOREIGN PATENT DOCUMENTS

| | | | |
|---|---|---|---|
| 122152 | 8/1946 | Australia | 15/3.15 |
| 53-46234 | 11/1978 | Japan . | |
| 578052 | 2/1978 | U.S.S.R. | 15/3.13 |
| 1035472 | 7/1966 | United Kingdom | 15/3.16 |

*Primary Examiner*—Frankie L. Stinson
*Attorney, Agent, or Firm*—Ronald R. Snider; Snider & Associates

[57] ABSTRACT

A warm water supply spot is located near a top end of an egg conveyance device and the degree of slope for the device is increased in the region from the water supply spot to the top end, so that the water dammed by the egg moving up the egg conveyance device does not overflow at the top end. The water is used efficiently without waste.

4 Claims, 2 Drawing Sheets

EGG WASHING APPARATUS

RELATED INVENTION

This application claims the priority of Japanese Utility Model Application No. 9-9176 (filed on Sep. 29, 1997) which is expressly incorporated herein by reference in its entirety.

BACKGROUND OF THE INVENTION

In the prior art, an egg washing apparatus was supplied in the following constructions. An egg conveyance device which is composed of plural troughed roller channels is established in a slope condition, wherein at one side an egg supply portion is provided at a lower end while at the other side an egg wayout is prepared at a higher end. The egg to be washed is conveyed while rolling toward upside from the lower end to the higher end in the device. Warm water is poured into the device at a higher portion and the water runs downward naturally in each channel. The egg in the channel is conveyed upward rollingly to meet the water while it dams up the flow of water. By this meeting between the egg and the water, the egg can take a bath with small quantity of water, so that the egg is washed and effective utilization of the warm water can be attained.

However, in this prior art, the flow of the warm water is dammed by launching of the egg and then one part of the water is forced to flow upstream with the egg, and finally it overflows from the top end. This overflowing results in largely weakening the washing effect for the egg and the water is wasted.

SUMMARY OF THE INVENTION

This invention has an object to provide an egg washing apparatus, wherein an overflowing of warm water is avoided and all poured water can be efficiently used for the egg washing. This provides an effective utilization of warm water.

In order to achieve this object, as a first counter measure, it is thought that a width of a channel for an egg is widened so that the back flow of warm water may be prevented. Surely, by this change, the water runs downward smoothly because it is not dammed by the existence of the egg. Although this change can promote smooth flow of the water toward the bottom end, it cannot offer, on the contrary, the effective washing of the egg with small quantity of the water, which is the main object of the present invention.

As a second measure, the degree of the slope is increased so that an overflowing of warm water may be prevented. This degree change, however, invites faster flow of the water, which also results to diminish the effective washing of the egg with small quantity of the water.

The counter measures explained above cannot eliminate the present defect with desirable results. The present inventor, therefore, has made various experiments to avoid the defect in order to attain the effective washing of the egg as well as the prevention of the back flow of the water. After numerous trials and errors, this inventor came to reach the following knowledge for resolving the problem.

In this invention, as a result, the degree of the slope is increased at in only one region of the channel, namely the region higher than the water supply spot, while below the spot the degree of the slope is decreased.

When this constitution is adopted, the overflow of the water is prevented, and when the water passes over the spot, the depth of the water is increased so that the effective washing of the egg with a small quantity of the water can be fulfilled.

In an egg washing apparatus, wherein an endless ladder chain having a number of staves formed in parallel is established in a slope condition for carrying the egg, where an egg supply side is prepared at a lower end and an egg wayout is also prepared at a higher end, and wherein along the back side of this ladder chain plural channels for transferring the egg are formed in the same slope condition, each channel is trough-shaped and a warm water supply spot is equipped with in the vicinity of the top portion of the channel, the present invention has the improvement which comprises the increase of the slope degree for both the chain and the channel only for the region which is higher than the water supply spot.

On the other hand, this invention also comprises the following construction. In an egg washing apparatus, wherein an egg conveyance device composed of plural troughed roller channels is established in a slope condition between an egg supply side and an egg wayout, and wherein an endless ladder chain with numbers of staves is put on the channels and an egg is inserted into each sectioned room formed by the channel and the stave while the egg is transferred rollingly by the stave toward upside of the egg wayout running through the troughed channel and during this launching the egg is washed by warm water, the improvement is adopted in the method that warm water supply spot is equipped with in the vicinity of the top portion and the degree of the slope-from the water supply spot toward the egg supply side is decreased, whereas the overflow of the water caused by the damming work of the rolling egg over the egg wayout is prevented.

Further, the water supply spot is established in the vicinity of the egg wayout at a position where the degree of the slope changes.

DESCRIPTIONS OF THE PREFERRED EMBODIMENT

Figure 1:
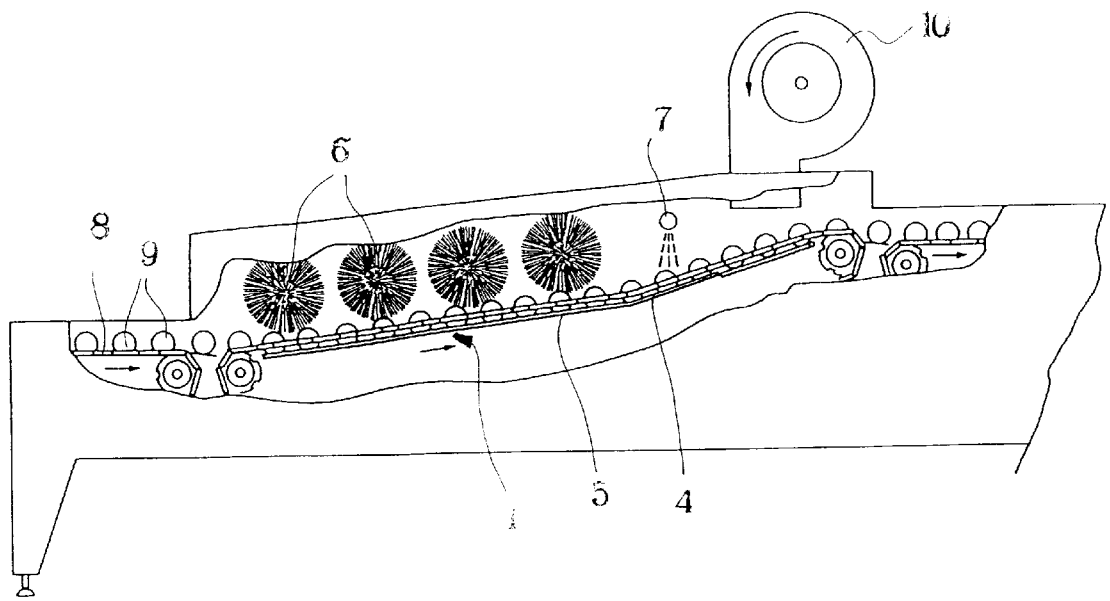
FIG. 1 is a perspective side view of an egg washing apparatus developed by this invention.
Figure 2:
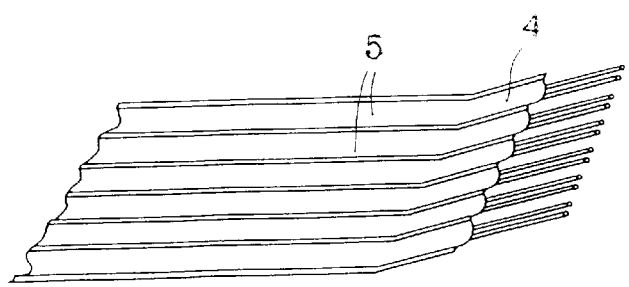
FIG. 2 is a perspective view of an egg conveyance device for carrying an egg.
Figure 3:
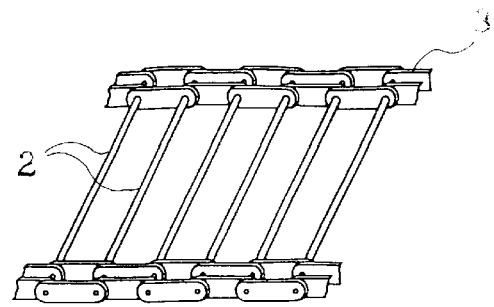
FIG. 3 is a partially perspective view of an endless ladder chain for carrying an egg.
Figure 4A:
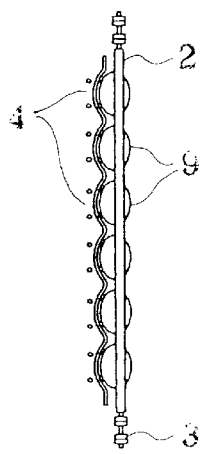
FIG. 4A is a side view where a connection between an egg, a ladder chain and an egg conveyance device for carrying an egg is shown when the egg is set for transferring.
Figure 4B:
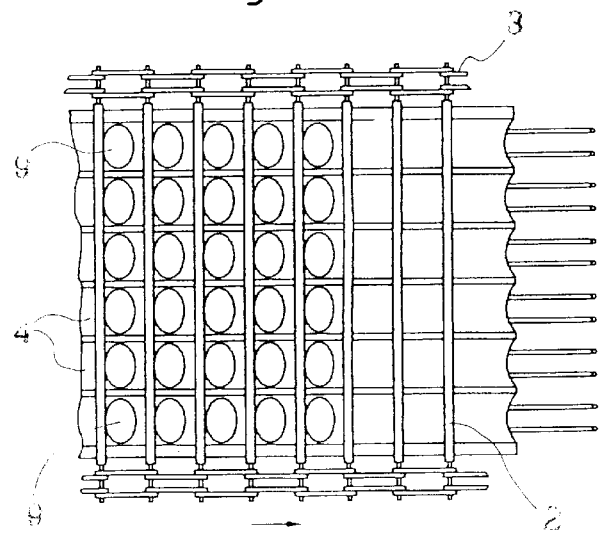
FIG. 4B is a plan view of FIG. 4A.

Now the preferred embodiment is explained in reference with the submitted drawings from FIG. 1 to FIG. 4B.

In these figures, the numeral 1 is an endless ladder chain. It has a number of staves (2) for carrying an egg which is aligned in parallel and it is driven by a driving chain (3) in series. This ladder chain (1) is established in a slope condition where the egg supply side is located at a lower end while the egg wayout is located at a higher end. Each stave (2) has a gap into which an egg can be inserted. The numeral 4 is an egg conveyance device which extends towards the driving direction and has a slope in parallel with the ladder chain (1). The numeral 5 is a channel provided by the device (4) in a trough shape. Each channel (5) of the device (4) has a width wherein an egg can be placed and can be rolled. In the vicinity of a top end a warm water supply spot (7) is provided. The degree of the slope is increased from the region from the vicinity of the water supply (7) towards the upward end. The numeral 6 is a washing brush device, while the numeral 8 is an egg supply conveyor belt. The numeral 9 is the egg and the numeral 10 is an air fan to dry the washed egg.

In this embodiment, the present egg washing apparatus comprises:

The egg supply conveyor (8) contains numbers of the eggs (9) aligned neatly and transfers these eggs (9) to the egg supply side of the device (4). The device (4) for transferring the egg (9) having plural channels (5) is established in the slope condition between the egg supply side and the egg wayout after washing. The endless ladder chain (1) is composed of two pieces of driving chains (3) and the staves (2) connected in to form a ladder chain therebetween. The warm water supply spot (7) which supplies warm water over the device (4) is located at the upper portion of the device toward the egg wayout. Several pieces of the washing brushes (6) are arranged in a row from the egg supply side to the water supply spot (7). The air fan (10) to dry out the washed eggs (9) is established just between the water supply spot (7) and the egg wayout, wherein in the endless ladder chain (1) the staves (2) are provided in the same manner of the device (4). The degree of the slope for the device (4) in the region from the water supply spot (7)to the egg supply side is devised to be gentler than the degree of the slope in the region from the water supply spot to the egg wayout. The increased slope degree prevents the launching egg (9) from overflow causing of the supplied water from the top end.

The egg (9) transferred by the egg conveyor (8) is placed into the sectioned room produced by the channel (5) and the stave (2) and it is fixed in the room and gradually conveyed in rolling condition upward in the direction of its wayout by pushing power of the stave (2). Warm water poured by the warm water supply spot (7) runs naturally downward in the channel (5), during which the egg (9) is launching forward in rolling in the condition of the water damming and it is washed by the water. Above the water supply spot, as the degree of the slope is devised not to incur the back flow of the water, the egg (9) is transferred forward without any overflow from the top end of the egg wayout.

As shown in FIG. 1, sticky dirt which can not be eliminated by water washing is excluded by plural washing brushes (6) during the washing process.

The warm water described in this invention means the water from 50° C. to 60° C., and this temperature is proper for the egg washing for clearing performance and without offering any wrong influence for the egg quality.

It is now explained, according to the knowledge of this present inventor, the preferable degree of the slope for the present apparatus developed by this invention as follows:

1) Total length of the egg conveyance device (4): 2.932 meters
2) The degree of the slope from the egg supply side to the warm water supply spot (7) is set about 1.5 degrees against the level surface of the egg supply side, while the distance from the side to the warm water supply spot (7) is 2.641 meters.
3) The degree of the slope from the warm water supply spot (7) upto the top end of the egg wayout is defined at about 10 degrees thereof.

As explained so far, in the present invention, the degree of the slope from the warm water supply spot (7) toward the top end for both of the endless ladder chain (1) and the egg conveyance device (4) is arranged to be increased, whereas the back flow of the water is prevented and all water is used for the egg washing properly.

At the same time, the degree of the slope from the vicinity of the warm water supply spot (7) to the bottom end of the egg supply side is also arranged to be decreased, so that the launching of the egg may not invite the back flow of the used water. Therefore, the overflow of the water is prevented, which results all water to be used for the egg washing in the course.

As explained, this invention has resolved the difficult problem such as preventing the overflow of the warm water from the top end with an effective utilization of warm water at minimum. Therefore, this invention may receive good appreciation over people in the relative industry.

It is further understood by those skilled in the art that the foregoing description is a preferred embodiment of the disclosed matter and that various changes and modifications may be made in the invention without departing from the spirit and scope thereof.

What is claimed is:

1. In an egg washing apparatus comprising:

an endless ladder chain equipped with staves formed in parallel for transferring an egg, wherein the endless ladder chain is established in a sloped condition where an egg supply side is at a lower end and an egg wayout is at a higher end; an egg conveyance device is placed just below the ladder chain at the same slope in the driving direction;

wherein the egg conveyance device has plural channels in troughed shape to receive eggs; and warm water supply spot located in the vicinity of tops of channels;

wherein the improvement comprises: a degree of the slope for the endless ladder chain and the egg conveyance device which is greater for the region from the vicinity of the warm water supply spot to the egg wayout, than the degree of the slope from the egg supply side to the warm water supply spot.

2. An egg washing apparatus according to claim 1, wherein the warm water supply spot is located in the vicinity of a top end of an egg wayout side at the upper position than where slope changes.

3. In an egg washing apparatus comprising:

an egg conveyance device having plural trough shaped channels established in a sloped condition where an egg supply side is at a lower end and an egg wayout is at a higher end for transferring an egg;

an endless ladder chain with staves placed on the channels;

an egg is inserted into at least one sectioned room formed by the channels and the staves;

wherein the egg is transferred rollingly by a stave toward as the egg moves towards a top end in a channel; and wherein during transferring the egg meets warm water for washing;

wherein the improvement comprises: a warm water supply spot located at the upper portion of the egg conveyance device near to the top end of the egg wayout, and the degree of the slope from the warm water supply spot to the bottom end of the egg supply side is arranged to be less than the degree of the slope from the warm water supply spot to the top end, whereby back flow of the water is prevented.

4. An egg washing apparatus according to claim 3, wherein the warm water supply spot is located in the vicinity of a top end of an egg wayout side at the upper position than where slope changes.

* * * * *